(12) United States Patent
Ma et al.

(10) Patent No.: US 12,481,654 B2
(45) Date of Patent: Nov. 25, 2025

(54) DATA PROCESSING METHOD, ELECTRONIC DEVICE, AND STORAGE MEDIUM

(71) Applicant: CLOUD INTELLIGENCE ASSETS HOLDING (SINGAPORE) PRIVATE LIMITED, Singapore (SG)

(72) Inventors: Zhanfeng Ma, Zhejiang (CN); Xinjun Yang, Zhejiang (CN); Jianwei Zhao, Zhejiang (CN); Feifei Li, Zhejiang (CN); Gui Huang, Zhejiang (CN)

(73) Assignee: CLOUD INTELLIGENCE ASSETS HOLDING (SINGAPORE) PRIVATE LIMITED, Singapore (SG)

( * ) Notice: Subject to any disclaimer, the term of this patent is extended or adjusted under 35 U.S.C. 154(b) by 0 days.

(21) Appl. No.: 18/858,302

(22) PCT Filed: Jun. 1, 2023

(86) PCT No.: PCT/CN2023/097899
§ 371 (c)(1),
(2) Date: Oct. 18, 2024

(87) PCT Pub. No.: WO2023/232120
PCT Pub. Date: Dec. 7, 2023

(65) Prior Publication Data
US 2025/0272286 A1 Aug. 28, 2025

(30) Foreign Application Priority Data
Jun. 2, 2022 (CN) .......................... 202210626163.5

(51) Int. Cl.
*G06F 16/2453* (2019.01)
*G06F 16/22* (2019.01)
*G06F 16/2458* (2019.01)

(52) U.S. Cl.
CPC .... *G06F 16/24542* (2019.01); *G06F 16/2246* (2019.01); *G06F 16/2282* (2019.01); *G06F 16/2462* (2019.01)

(58) Field of Classification Search
CPC ........... G06F 16/24542; G06F 16/2246; G06F 16/2282; G06F 16/24569; G06F 16/2462
See application file for complete search history.

(56) References Cited

U.S. PATENT DOCUMENTS 5,875,445 A * 2/1999 Antonshenkov ............................ G06F 16/24542 707/999.102
7,213,012 B2 * 5/2007 Jakobsson ......... G06F 16/24549
(Continued)

FOREIGN PATENT DOCUMENTS

CN 103823865 A 5/2014
CN 108614836 A 10/2018
(Continued)

OTHER PUBLICATIONS

Joshi et al., "Materialized Sample Views for Database Approximation," in IEEE Transactions on Knowledge and Data Engineering, vol. 20, No. 3, pp. 337-351, Mar. 2008, doi: 10.1109/TKDE.2007. 190664. (Year: 2008).*

(Continued)

*Primary Examiner* — James E Richardson
(74) *Attorney, Agent, or Firm* — The Sun IP Law

(57) ABSTRACT

Embodiments of the present disclosure provide a data processing method, an electronic device, and a storage medium. In the embodiments of the present disclosure, in a process of obtaining random sampling data from the target database table, through an index tree scanning manner in combine with a mechanism for random sampling a data page of the database table, full-table scanning is not performed on the target database table, thereby effectively reducing the num- (Continued)

ber of times that I/O access is performed on the disk, saving disk I/O resources, and enhancing the query performance of the database system, especially in the case that the distributed database system has mass data.

20 Claims, 7 Drawing Sheets

(56) References Cited

U.S. PATENT DOCUMENTS

| | | | |
|---|---|---|---|
| 2003/0097354 A1 | 5/2003 | Finlay | |
| 2011/0035359 A1 | 2/2011 | Bendakovsky | |
| 2014/0115009 A1* | 4/2014 | Lashley | G06F 16/2453 707/E17.012 |
| 2014/0317087 A1* | 10/2014 | Collins | G06F 16/2455 707/715 |
| 2018/0096006 A1* | 4/2018 | Das | G06F 16/221 |

FOREIGN PATENT DOCUMENTS

| | | | |
|---|---|---|---|
| CN | 110309196 A | 10/2019 | |
| CN | 113918535 A | 1/2022 | |
| CN | 114328500 A | 4/2022 | |
| CN | 115168338 A | 10/2022 | |
| EP | 0797160 A2 * | 9/1997 | G06F 16/284 |

OTHER PUBLICATIONS

The ISR of the PCT application No. PCT/CN2023/097899, issued on Sep. 13, 2023.
(Non-official translation: Wang, Rong,video post-production)."Mysql and oracle Random Selection, and Random Extraction of N Records from Oracle)" [(Online), [searched on Sep. 11, 2023]. retrieved from the internet: <https://blog.CSDN.net/Weixin_33069291/Article/Details/115904462>, Mar. 18, 2021(Mar. 18, 2021), pp. 1-6.
(Non-official translation: [mysql] The Difference and Connection between Full-table Scanning Process and Clustered Indexes ) ([Online), [searched on Sep. 11, 2023, retrieved form the Internet:<https://blog.CSDN.net/m0_45406092/article/details/112723444>Jan. 16, 2021 (Jan. 16, 2021), p. 1.
Wale Garrett."(Non-official translation: Full-table Scanning and Index Tree Scanning in MySQL)" ([Online), [searched on Sep. 11, 2023, retrieved form the Internet:<https://www.CNBLOGS.com Garre Walk P/16271622 HTML>)May 14, 2022 (May 14, 2022), pp. 1-4.
The search report of the priority CN patent application No. 202210626163.5 issued on Jun. 3, 2025.

* cited by examiner

DATA PROCESSING METHOD, ELECTRONIC DEVICE, AND STORAGE MEDIUM

CROSS-REFERENCE TO RELATED APPLICATIONS

The present disclosure is a National Stage of International Application No. PCT/CN2023/097899, filed on Jun. 1, 2023, and claims priority of Chinese Patent Application No. 202210626163.5, filed to China National Intellectual Property Administration on Jun. 2, 2022 and titled "Data Processing Method, Electronic Device, and Storage Medium". The contents of both the International Application and the Chinese Patent Application are hereby incorporated by reference in their entirety.

TECHNICAL FIELD

The present disclosure relates to the technical field of computer technologies, and in particular, to a data processing method, an electronic device, and a storage medium.

BACKGROUND OF THE INVENTION

A database system commonly uses a disk for storing data and uses a page (also called a data page) as a basic unit of disk and memory exchange. Usually, the data page stores multiple row records in a database table provided by a database. Generally, the data volume of the database table maintained in the database is relatively large, and all row records of one database table are stored in multiple data pages in the disk. That is, one data page stores multiple records in the database table.

In some application scenarios, in order to meet data requirements of a client, the database system randomly samples the database table to obtain random sampling data of the database table. In general, Input/Output (I/O) access is performed on the disk for many times, and multiple data pages corresponding to the database table are loaded into the memory from the disk. All row records in the database table are read from the multiple data pages in a full table scanning manner in the memory, and then all the row records are randomly sampled to obtain random sampling data in the database table.

However, a manner of randomly sampling the database table is prone to frequently access the disk, which consumes more resources of the disk I/O, thereby reducing the query performance of the database system, especially in the case that a distributed database system has mass data.

SUMMARY OF THE INVENTION

Many aspects of the present disclosure provide a data processing method, an electronic device, and a storage medium, so as to reduce the number of times that I/O access is performed on a disk, save disk I/O resources, and enhance the query performance of a database system.

Some embodiments of the present disclosure provide a data processing method, including that:
an index tree corresponding to a target database table is traversed to determine the last non-leaf layer of the index tree, each leaf node in a leaf layer of the index tree being associated with a data page in a disk, and different data pages storing different row records of the target database table;
for each non-leaf node in the last non-leaf layer, a current index item is sequentially read from an index page associated with the non-leaf node, and a random number for the current index item is randomly generated;
in response to the random number meeting a random data sampling condition, a target data page of a leaf node, pointed by the current index item, is loaded from the disk to a memory, row records in the target data page are read from the memory and the row records are stored.

Some embodiments of the present disclosure further provide a data processing method, including that:
a SQL statement submitted by a client for a target database table is received;
obtaining random sampling data from the target database table;
the SQL statement is converted into an abstract syntax tree, and a final execution plan is generated based on the random sampling data and the abstract syntax tree;
the final execution plan is converted into a physical execution plan, and a database where the target database table is located is queried according to the physical execution plan to obtain a query result, and the query result is outputted to the client.

Some embodiments of the present disclosure further provide an electronic device, including: a memory and a processor; the memory is arranged for storing a computer program, and the processor is coupled with the memory and is arranged for executing the computer program to perform the steps in the data processing method.

Some embodiments of the present disclosure further provide a computer storage medium storing a computer program, and when the computer program is executed by a processor, the processor is arranged for implementing the steps in the data processing method.

In some embodiments of the present disclosure, in a process of obtaining random sampling data from the target database table, through an index tree scanning manner in combine with a mechanism for random sampling a data page of the database table, full-table scanning is not performed on the target database table, thereby effectively reducing the number of times that I/O access is performed on the disk, saving disk I/O resources, and enhancing the query performance of the database system, especially in the case that the distributed database system has mass data.

BRIEF DESCRIPTION OF DRAWINGS

The drawings described herein are used for providing a further understanding of the present disclosure and constitute a part of the present disclosure, and the illustrative embodiments of the present disclosure and the description thereof are used for explaining the present disclosure, and do not constitute an improper limitation on the present disclosure. In the drawings.

DETAILED DESCRIPTION OF THE INVENTION

To make the objectives, technical solutions, and advantages of the present disclosure clearer, the following clearly and completely describes the technical solutions of the present disclosure with reference to specific embodiments of the present disclosure and corresponding accompanying drawings. Apparently, the described embodiments are a part but not all of the embodiments of the present disclosure. All other embodiments obtained by the person having ordinary skill in the art based on the embodiments of the present disclosure without creative efforts shall fall within the protection scope of the present disclosure.

An existing manner of randomly sampling the database table is prone to frequently access the disk, which consumes more resources of the disk I/O, thereby reducing the query performance of the database system, especially in the case that a distributed database system has mass data. To this end, some embodiments of the present disclosure provide a data processing method, an electronic device, and a storage medium. In some embodiments of the present disclosure, in a process of obtaining random sampling data from the target database table, through an index tree scanning manner in combine with a mechanism for random sampling a data page of the database table, full-table scanning is not performed on the target database table, thereby effectively reducing the number of times that I/O access is performed on the disk, saving disk I/O resources, and enhancing the query performance of the database system, especially in the case that the distributed database system has mass data.

The technical solutions provided in some embodiments of the present disclosure are described in detail below with reference to the accompanying drawings.

Figure 1:
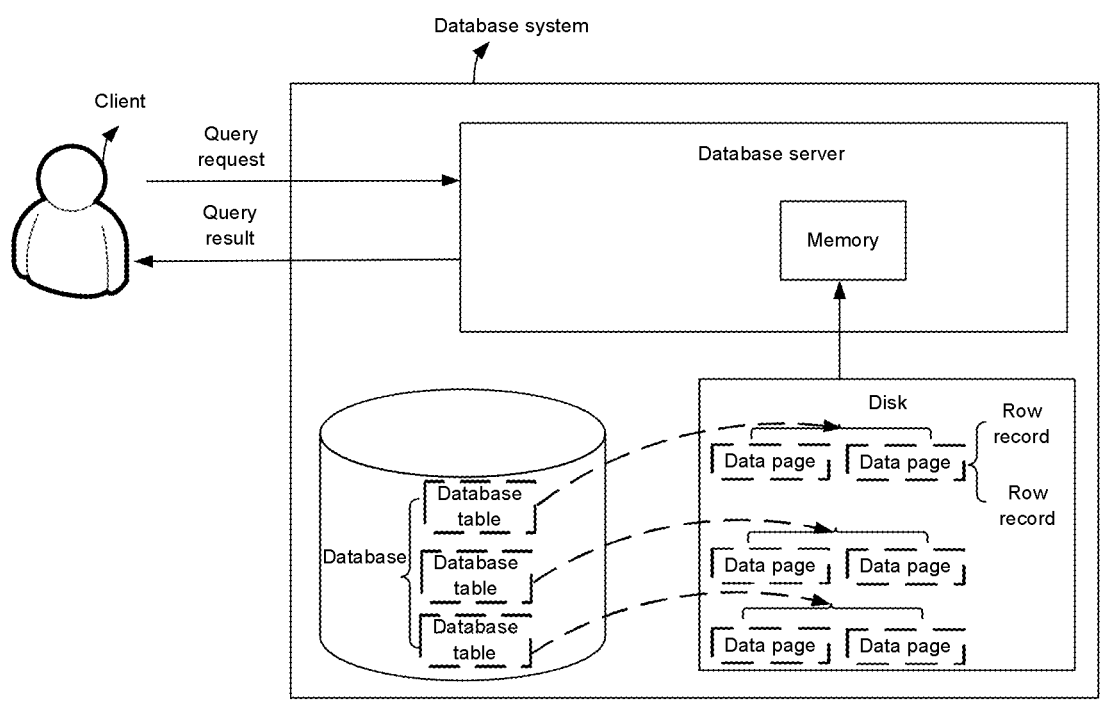
FIG. 1 is a schematic structural diagram of a database system according to some embodiments of the present disclosure.

FIG. 1 is a schematic structural diagram of a database system according to some embodiments of the present disclosure. As shown in FIG. 1, a Database System (DBS) includes a database server and a disk. The database server assumes a database management function, including system configuration and management, data access and update management, data integrity management and data security management, undertakes a query and modification task of a database, and undertakes a maintenance function of the database, but is not limited thereto.

In some embodiments, the database server queries the database to obtain a query result in response to a query request sent by a client, and returns the query result to the client. A general process of obtaining the query result by the database server is as follows. The database server accesses the disk to load the data page including the query result into the memory from the disk, accesses the memory to read the query result from the data page, and returns the query result to the client.

In some embodiments, the database system uses the disk to store data, and various data (including various database tables) in the database are stored in a disk file of the disk. Each disk file includes multiple data pages, and each data page is the smallest unit of reading data from the disk.

Figure 2:
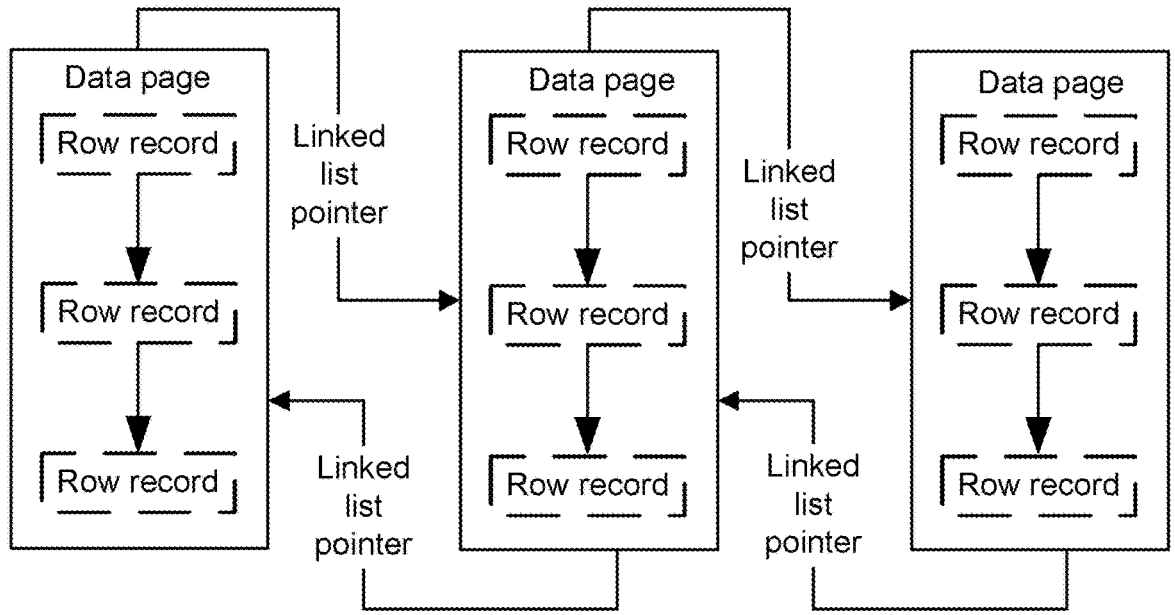
FIG. 2 is a data structure of an exemplary data page.

Generally, all row records (referring to a row of data in a database table) in each database table are stored in the multiple data pages, each data page including at least one row record in a database table. Each row of data in the data page is sequentially stored according to the size of a primary key, and a pointer of each row of data is used for pointing to a position of the next row of data to form a unidirectional linked list. The primary key uniquely identifies the row data, and the data page stores other row data according to actual application requirements in addition to row records in the storage database table. As shown in FIG. 2, a large number of data pages are stored sequentially, page by page, and two adjacent data pages are mutually referenced in a bidirectional linked list format. One linked list pointer in the bidirectional linked list points to the access information of the previous data page, and the other linked list pointer in the bidirectional linked list points to the access information of the next data page. The access information includes a page number of the data page, and the data page is found based on the page number of the data page.

In some embodiments, different from the full table scanning manner, a database table is scanned in an index tree scanning manner. The type of the index tree is, for example, a Btree tree (also referred to as a B tree), a B-Tree (also referred to as a B–tree), and a B+tree (also referred to as a B+tree), but is not limited thereto. The B+tree has the following characteristics.

Characteristic One, the non-leaf node is used for storing key value information.

Characteristic Two, there are linked list pointers between all leaf nodes.

Characteristic Three, data records are stored in the leaf nodes.

For ease of understanding, an example in which the index tree is B+tree is taken as an example for description. A primary key of the database table is determined, and the primary key uniquely identifies an attribute or attribute group of a certain row in the database table. After the primary key of the database table is determined, a primary key index in the form of the B+tree index tree is created. The B+tree index tree sequentially includes a root node layer, at least one non-leaf layer, and a leaf layer from top to bottom. The root node layer includes one root node. The non-leaf layer includes at least one non-leaf node. The leaf layer includes at least one leaf node.

In some embodiments, the root node and the non-leaf node are respectively associated with an index page, and the index page maintains index information for indexing the database table. The leaf node is associated with a data page, and the data page includes row records in a database table indexed by at least one index tree. That is, the B+tree index tree maintains the row records in the database table in the data page corresponding to the leaf node, and the index page corresponding to other nodes except the leaf node maintains index information without maintaining any row record in the database.

In some embodiments, the index page maintains index information in the form of a maintenance index item. Specifically, an index page includes at least one index item. Optionally, each index item includes one primary key and access information pointing to the child node. The access information pointing to the child node includes a page number, storage location information, or access address information of the index page or the data page associated with the child node, but is not limited thereto. It should be understood that when the non-leaf node is a node in the last non-leaf layer in the index tree, the child node of the non-leaf node is a leaf node, and the index item of the non-leaf node includes access information of the data page associated with the child node. When the non-leaf node is a node in other non-leaf layers except the last non-leaf layer in the index tree, the child node of the non-leaf node is a non-leaf node, and the index item of the non-leaf node includes access information of the index page associated with the child node.

Figure 3:
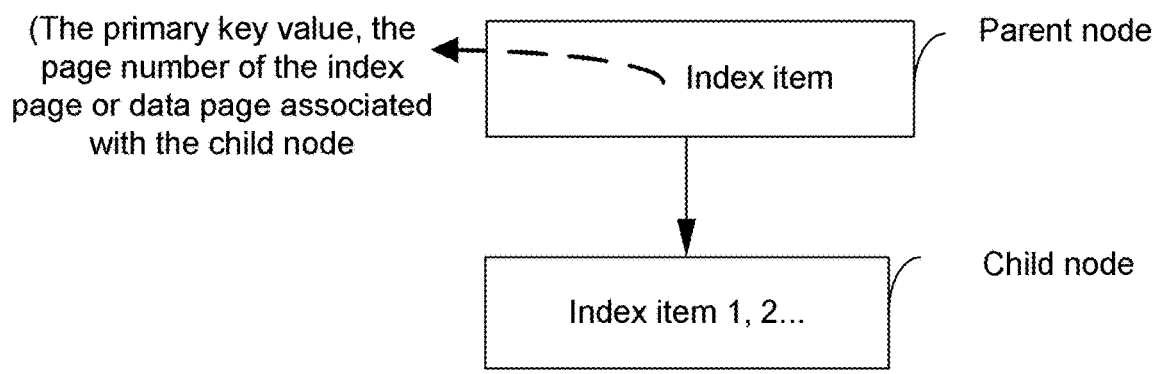
FIG. 3 is an exemplary parent node and child node.

As shown in FIG. 3, each index item includes a primary key and a page number of an index page or a data page associated with the child node, and a node, where the index item is located, is a parent node. The primary key reflects the unique row identification of the row record in the database table, and the primary key in the index item is used for deciding whether to continue to find the index page or data page associated with the child node. Specifically, if the primary key to be found is less than the primary key in the index item, it indicates that the primary key to be found is not in the index page or the data page associated with the child node. If the primary key to be found is greater than or equal to the primary key in the index item, it indicates that the primary key to be found with a certain probability in the index page or the data page associated with the child node, and the index page or the data page associated with the child node of the parent node is continued to be found.

Figure 4:
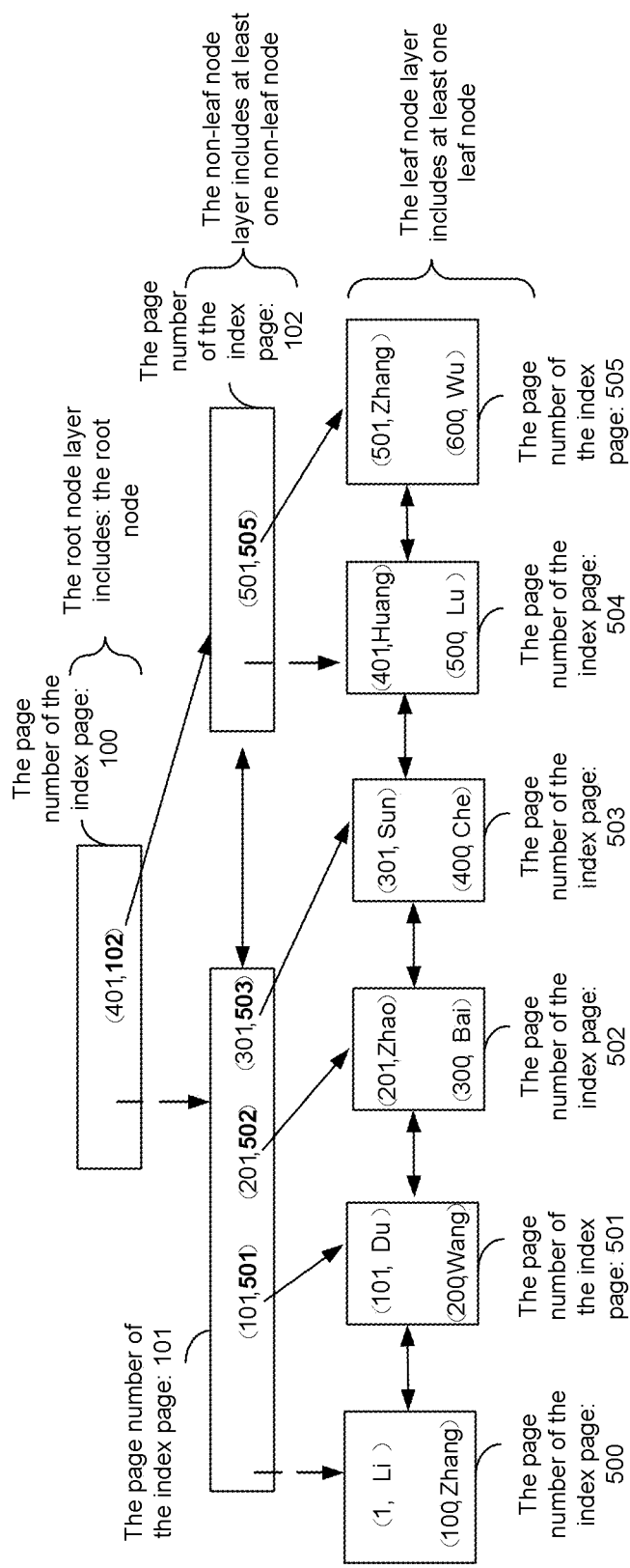
FIG. 4 is an exemplary index tree.

For ease of understanding, it is assumed that there is a database table of records (ID, name) as shown in Table 1, and a B+tree index tree in the form of a primary key index as shown in FIG. 4 is established by using ID as the primary key.

TABLE 1

| ID | Name |
|---|---|
| 1 | Li |
| ... | ... |
| 100 | Zhang |
| 101 | Du |
| ... | ... |
| 200 | Zhao |
| ... | ... |
| 300 | Bai |
| 301 | Sun |
| ... | ... |
| 400 | Che |
| 401 | Huang |
| ... | ... |
| 500 | Lu |
| 501 | Zhang |
| ... | ... |
| 600 | Wu |

As shown in FIG. 4, the page number of the index page corresponding to the root node is 100, and one index item (401, 102) is recorded in the index page with the page number 100. 401 in the index item is a primary key, that is, a unique row identifier of a row record of which ID is 401 in Table 1. In this index item, 102 is the page number of the index page associated with the child node of the root node.

The page number of the index page corresponding to one non-leaf node is 101, and three index items are recorded in the index page with the page number 101, which are an index item (101, 501), an index item (201, 502), an index item (301, 503), respectively. 101 in the index item (101, 501) is a primary key, that is, a unique row identifier of a row record of which ID is 101 in Table 1, 501 is a page number of a data page associated with a child node (which is one leaf node) of the non-leaf node. In the same way, the meaning of the index term (201, 502) and the index term (301, 503) is not described herein again.

Based on the index tree, two finding operations are performed. One finding operation is performed through the range finding and paged finding of the primary key, and the other finding operation is performed through the random finding from the root node. In some embodiments, when the database table is randomly sampled, any data page corresponding to the database table is randomly sampled.

In some embodiments, a primary key range of each index item is determined according to the primary key in each adjacent index item. Specifically, the primary key range of the index item with a smaller primary key in the two adjacent index items is determined according to the primary key in the two adjacent index items in the index page. The minimum value in the primary key range of the last index item in the index page is the primary key recorded in the last index item, and the maximum value is the maximum value which covered by the index page. The maximum value which is covered by each index page is associated with a parent node corresponding to the index page.

For example, three index items of the index page 101 are sequentially arranged as an index item (101, 501), an index item (201, 502), and an index item (301, 503) in ascending order of the primary keys. The primary key in the index item (101, 501) is compared with the primary key in the index item (201, 502) to determine that the primary key range of the index item (101, 501) with a smaller primary key is from 101 to 200. The primary key in the index item (201, 502) is compared with the primary key in the index item (301, 503) to determine that the primary key range of the index item (201, 502) with the smaller primary key is from 201 to 300. For the primary key range of the index item (301, 503), based on a parent node corresponding to the index page 101, it is determined that the maximum value covered by the index page 101 is 400, and then the primary key range of the index item (301, 503) is from 301 to 400.

In some embodiments, the index item to which the primary key to be found belongs is determined according to the primary key range corresponding to which index item the primary key to be found falls, and the child node pointed by the index item is traversed to continue the query in the index page or the data page associated with the child node.

In some embodiments, the index item to which the primary key to be found belongs is further determined according to a dichotomy. Specifically, for the index page that is traversed currently, one of multiple index items with a smaller primary key is sequentially set as the current index item and the primary key to be found is compared with the current index item. If the primary key to be found is greater than the primary key in the current index item, the next index item of the current index item is used as a new current index item, and the primary key to be found is repeatedly compared with the current index item in sequence until the primary key to be found is less than or equal to the primary key in the current index item. If the primary key to be found is equal to the primary key in the current index item, the index item to which the primary key to be found belongs is the current index item. If the index item to which the primary key to be found belongs is less than the current index item, the index item to which the primary key to be found belongs is the previous index item of the current index item.

For example, when an index item matching the primary key to be found is found in the index page 101 of the page number, the index item (101, 501), the index item (201, 502), and the index item (301, 503) are sequentially used as the current index item. When the current index item is the index item (101, 501), the primary key 260 is compared with the primary key 101 in the index item (101, 501). Since the primary key 260 is larger than the primary key 101, the primary key 260 continues to be compared with the primary key 201 in the index item (201, 502). Since the primary key 260 is larger than the primary key 201, the primary key 260 continues to be compared with the primary key 301 in the index item (301, 503). Since the primary key 260 is less than the primary key 301, it means that the previous index item (201, 502) of the index item (301, 503) is the index item to which the primary key 260 belongs.

In an actual application, an index item or a row record of which a primary key is less than a primary key of the first index item in the root node or the non-leaf node is further stored in an index page or a data page. However, there is no index item pointing to the index page or the data page in the index page. In order to store the page number of the index page or the data page, the page number of the index page or the data page is stored in a page header (or other predefined positions) of the parent node. Subsequently, when the index tree is traversed to find the smaller primary key, the corresponding data page is still located. That is, the page number of the first child node of the index page corresponding to the root node or the non-leaf node lacks the corresponding index item, but the page number is stored in the page header (or other predefined locations) of the index page. Key values of all the index items or row records stored in the first child node are less than the key value contained in the first index item on the parent node of the first child node. As shown in FIG. 4, a dotted arrow points to the first child node of the index page corresponding to the root node or the non-leaf node.

For example, the page number 101 is stored in the page header of the index page with the page number 100 corresponding to the root node. The primary key with the key value less than 401 is stored in the index page 101. The index item corresponding to the primary key 401 is the first index item in the index page with the page number 100. The page number 500 is stored in the page header of the index page with the page number 101 corresponding to the first non-leaf node. The data page with the page number 500 stores the primary key with the key value less than 101, and the index item corresponding to the primary key 101 is the first index item in the index page with the page number 101. The page number 504 is stored in the page header of the index page with the page number 102 corresponding to the second non-leaf node. The data page with the page number is 504 stores the primary key with the key value less than 501, and the index item corresponding to the primary key 501 is the first index item in the index page with the page number 10.

Taking the primary key to be found being 90 as example, traversing from the root node, since the primary key 90 is less than the primary key 401 contained in the first index item (401, 100) corresponding to the root node, the page number 101 corresponding to the first child node is read from the page header of the index page with the page number 100. A dashed arrow as shown in FIG. 4 points from the index page with the page number 100 to the index page with the page number 101. And then the finding operation is performed on the index page 101.

Since the primary key 90 is less than the primary key value 101 contained in the first index item (101, 500), the page number 500 corresponding to the first child node of the index page 101 is read from the page header of the index page with the page number 101, and finally the row record corresponding to the primary key 90 is found from the data page with the page number 500.

Figure 5:
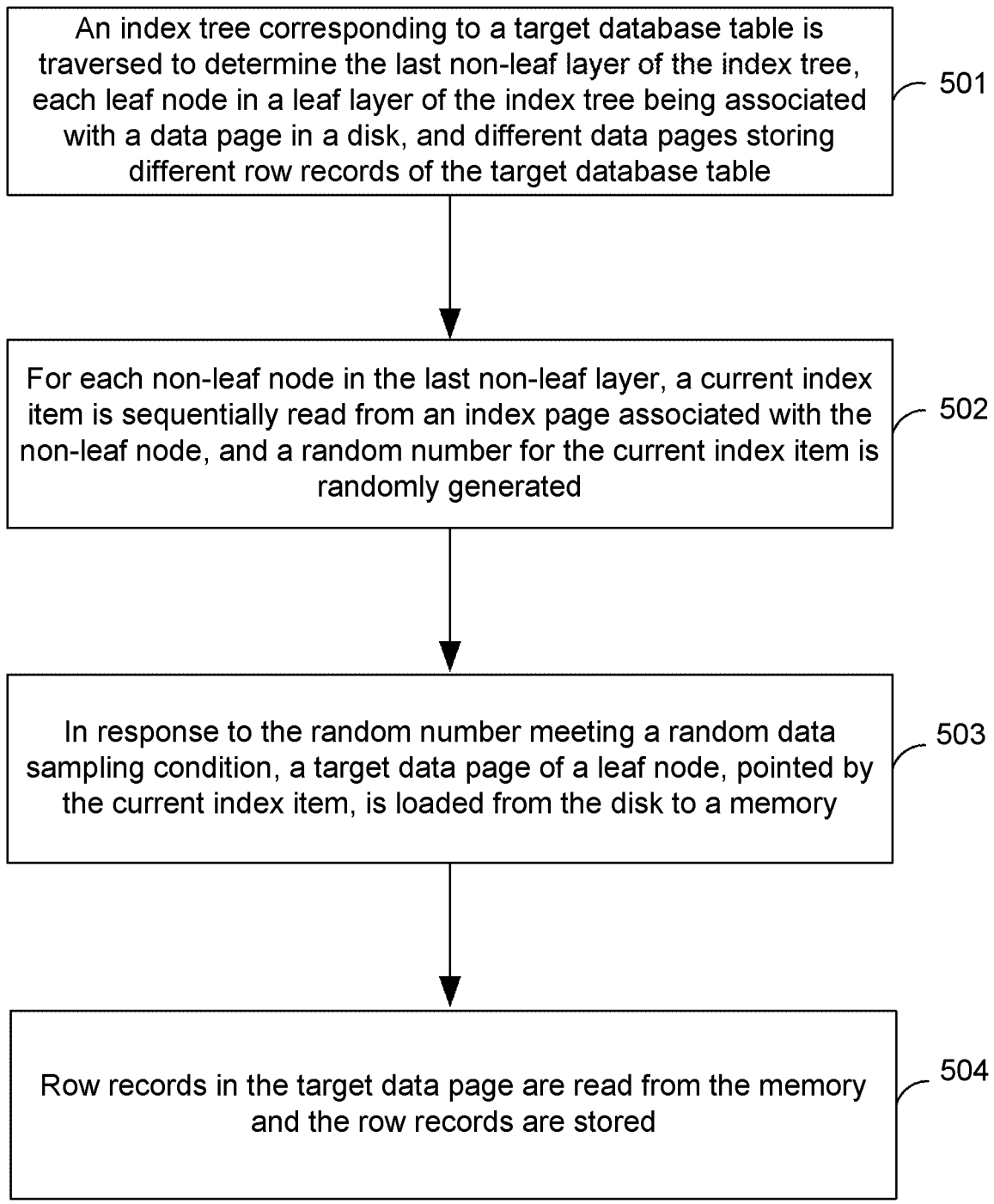
FIG. 5 is a flowchart of a data processing method according to some embodiments of the present disclosure.

With reference to FIG. 5, a detailed explanation for scanning the database table in an index tree scanning manner is provided. FIG. 5 is a flowchart of a data processing method according to some embodiments of the present disclosure. The method is performed by a data processing apparatus, and the apparatus is implemented by software and/or hardware, and is generally integrated into a database system, for example, integrated in a database server.

As shown in FIG. 5, the method includes the following steps.

In step 501, an index tree corresponding to a target database table is traversed to determine the last non-leaf layer of the index tree, each leaf node in a leaf layer of the index tree being associated with a data page in a disk, and different data pages storing different row records of the target database table.

In step 502, for each non-leaf node in the last non-leaf layer, a current index item is sequentially read from an index page associated with the non-leaf node, and a random number for the current index item is randomly generated.

In step 503, in response to the random number meeting a random data sampling condition, a target data page of a leaf node, pointed by the current index item, is loaded from the disk to a memory.

In step 504, row records in the target data page are read from the memory and the row records are stored.

In some embodiments, a target database table is any database table maintained in the database. In practical applications, data scanning is performed on multiple database tables in the database, and each database table for data scanning is set as the target database table.

In some embodiments, an index tree for performing index scanning on the target database table is pre-established. Taking the index tree being the B+tree in a primary key index form as an example, the index page associated with the root node and the non-leaf node includes at least one index item. Optionally, each index item includes one primary key and access information pointing to the child node. The access information pointing to the child node includes a page number and storage location information of an index page or the data page associated with the child node, but is not limited thereto. It should be noted that the storage location information is pre-associated with the page number. Accordingly, the index page or the data page is further accessed based on the page number. The storage location information includes, for example, storage location information in a disk or a memory, but is not limited thereto.

In some embodiments, for the target database table required to be randomly sampled, nodes of each layer are traversed from the root node of the index tree to the last non-leaf layer of the index tree.

After traversing to the last non-leaf layer, each non-leaf node in the non-leaf layer is traversed in sequence. For the currently traversed non-leaf node, one index item is read from the index page associated with the non-leaf node in sequence as the current index item, and a random number is randomly generated for the current index item. If the random number meets a random data sampling condition, the target data page of the leaf node pointed by the current index item is loaded into the memory from the disk, and the row records in the target data page of the memory is read and stored to complete the data collection of the target data page. If the random number does not meet the random data sampling condition, data of the target data page of the leaf node pointed by the current index item is abandoned.

In some embodiments, the random data sampling condition is flexibly set according to actual application requirements. For example, the random data sampling condition includes: the random number being less than or equal to a specified value. That is, in response to the random number being less than or equal to the specified value, a sampling operation is performed, and in response to the random number being greater than the specified value, the sample operation is abandoned.

The percentage of the specified value is a set sampling rate. The set sampling rate is selected between the minimum sampling rate and the maximum sampling rate. The minimum sampling rate and the maximum sampling rate are sampling rates flexibly set according to actual application requirements. For example, if the target database table has 10000 row records, the minimum sampling rate is 1%, and the maximum sampling rate is 99%. That is, 100 row records are sampled from the target database table at least, and 9900 row records are sampled at most. The set sampling rate is any value in a numerical interval [1%, 99%], and the specified value is any value in the numerical interval [1, 99]. If the set sampling rate is 10%, the specified value is set as 10. That is, if the random number is less than or equal to 10, the sampling operation is performed; and if the random number is greater than 10, the sampling operation is abandoned.

Taking FIG. 4 as an example, when traversing the index item (101, 501) in the index page with the page number 101 and the currently generated random number is less than or equal to the specified value, data collection operation is performed on the data page with the page number 501. If the currently generated random number is greater than the specified value, the data collection operation is abandoned on the data page with the page number 501.

In some embodiments, as to the target data page for determining the data collection operation, the disk is accessed to load the target data page from the disk to the memory. And then the memory is accessed to read the row records in the target data page, and the row records are stored, so that the data collection of the target data page can be completed. After all non-leaf nodes in the last non-leaf layer on the index tree are traversed, the whole task of randomly sampling the data page in the target database table is completed, and at this time, the row records of each target data page are the random sampling data of the target database table.

In some embodiments, for row records in the target data page read through accessing the memory, the row records are stored at a specified storage location, or the row records are cached in a dedicated cache pool, or the row records are directly sent to the client, which is not limited herein. Certainly, after the row records in the target data page of the memory are read and stored, the stored row records are sent to the client.

In some application scenarios, the database system is required to perform data statistics on data (specifically referred to as row records of the database table) maintained in the database, and the statistical information includes, but is not limited to, a data volume size, a data distribution, and a unique value. Therefore, in some embodiments, information statistics is performed on the stored row records, and the statistical result information is sent to the client. It should be noted that, after the random sampling task of one target database table is completed, information statistics is performed on all stored row records. Or, after the random sampling task of the multiple target database tables is completed, the information statistics is performed on all the stored row records, which is not specifically limited.

For the target database table with 1000000000 row records, if the sampling rate is 50%, half of the row records are sampled from the target database table. Assuming that the size of each data page is 16 kilobyte (KB), if the existing full table scanning mode is adopted, the number of consumed disks I/O is 6250,000. By contrast, if the index tree scanning mode of the present disclosure is adopted, the number of consumed disks I/O is 3128906. It can be seen that, in an ideal situation, the number of disks I/O consumed by the index tree scanning mode of the present disclosure is half of the number of disks I/O consumed by the full table scanning mode. In addition, the smaller the sampling rate, the more disk I/O can be saved, and the performance advantages can be more obvious.

In the technical solution provided in some embodiments of the present disclosure, in a process of obtaining random sampling data from the target database table, through an index tree scanning manner in combine with a mechanism for random sampling a data page of the database table, full-table scanning is not performed on the target database table, thereby effectively reducing the number of times that I/O access is performed on the disk, saving disk I/O resources, and enhancing the query performance of the database system, especially in the case that the distributed database system has mass data.

In practical applications, multiple row records are stored in the data page. In order to accurately read the row records of the data page one by one from the memory, a leaf cursor is used for controlling a reading process of the row record. Therefore, in some embodiments, the process of reading and storing the row record in the target data page of the memory includes the following steps. In response to a row record collection event triggered by calling a row record collection interface, a row record, following the last stored row record in the leaf cursor, in the target data page loaded to the memory is read, the currently read row record is stored, and the currently read row record is stored in the leaf cursor. The above steps are repeated until all the row records in the target data page are completely read.

In some embodiments, a row recording collection interface for returning the next sampling data is provided. For example, the row recording collection interface is denoted as InnodbSampler::next( ). An initialization interface for sampling initialization is further provided. For example, the initialization interface is denoted as InnodbSampler::init( ). After sampling is completed, a cleaning interface for resource cleaning is further provided. For example, the cleaning interface is denoted as InnodbSampler::end( ). Each interface mentioned above is a Software Development Kit (SDK) interface, or is an Application Programming Interface (API), which is not limited herein.

In some embodiments, before starting the data sampling operation on the data page, the initialization interface is called to perform the sampling initialization operation. After the data sampling operation is performed on the data page, the row record collection interface is called to obtain the random sampling data one by one. After the data sample operation on the data page is completed, the cleaning interface is called to perform the resource cleaning operation.

In some embodiments, in addition to calling the row record collection interface to trigger the row record collection event, the leaf cursor is further used for storing the row record read each time, so as to locate the next row record required to be read. In this way, before reading the next row record, the last row record stored in the leaf cursor is used for accurately locating the previous row record in the data page. A row record following the previous row record is the next row record required to be read currently.

It should be noted that, in addition to storing the row record read each time, the leaf cursor further stores a log sequence number (LSN) of the data page. If data content in the data page is modified, the LSN of the data page has changed. If the data content in the data page is not modified, the LSN of the data page remains unchanged. Further optionally, in order to accurately read the row records in the data page row by row, the LSN of the data page is combined to determine a reading manner of the next row record.

Figure 6:
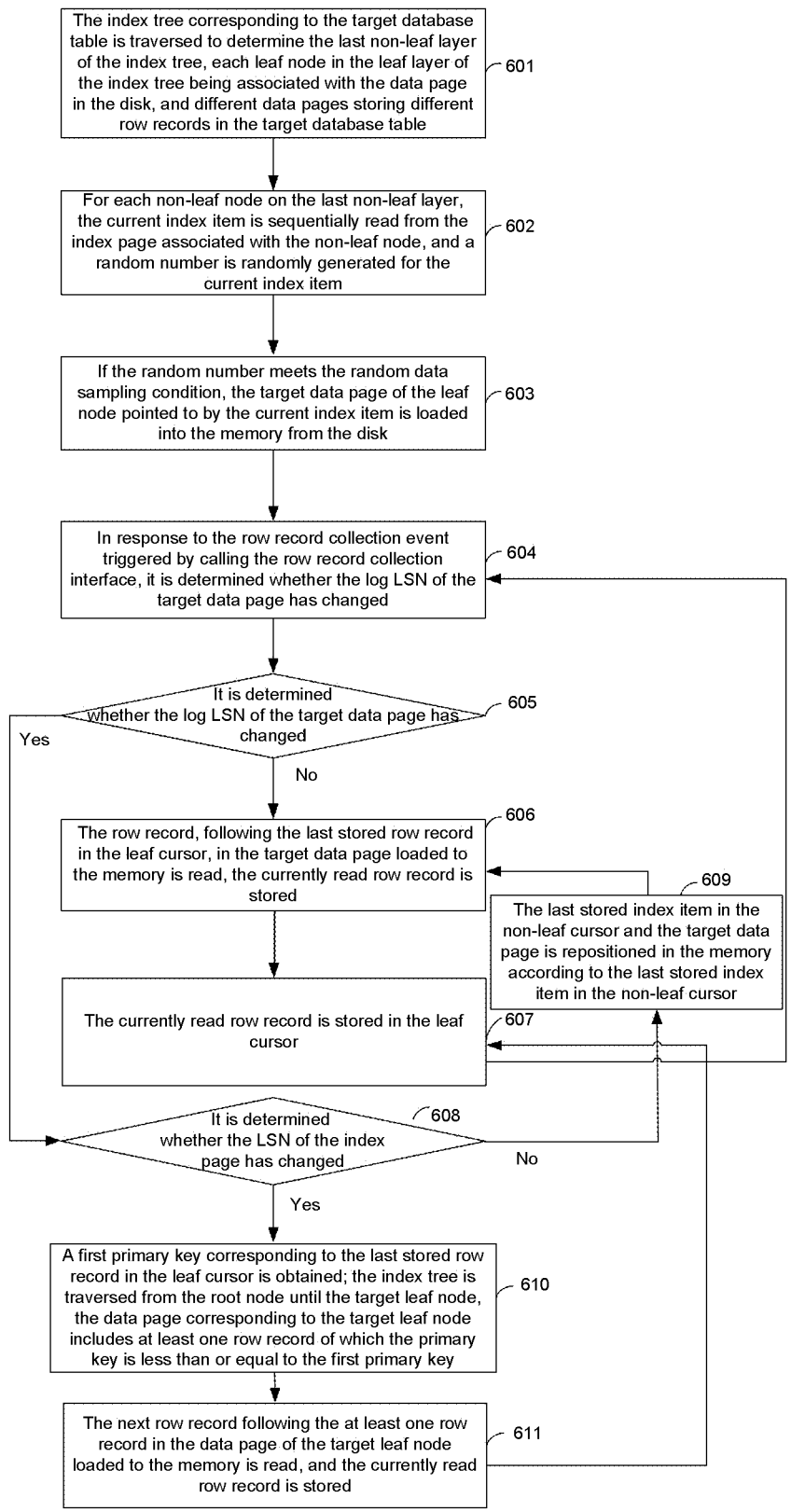
FIG. 6 is a flowchart of another data processing method according to some embodiments of the present disclosure.

Based on the foregoing, some embodiments of the present disclosure further provide a data processing method, as shown in FIG. 6, the method includes the following steps.

In step 601, the index tree corresponding to the target database table is traversed to determine the last non-leaf layer of the index tree, each leaf node in the leaf layer of the index tree being associated with the data page in the disk, and different data pages storing different row records of the target database table.

In step 602, for each non-leaf node on the last non-leaf layer, the current index item is sequentially read from the index page associated with the non-leaf node, and a random number is randomly generated for the current index item.

In step 603, if the random number meets the random data sampling condition, the target data page of the leaf node pointed by the current index item is loaded into the memory from the disk.

In step 604, in response to the row record collection event triggered by calling the row record collection interface, it is determined whether the log LSN of the target data page has changed.

In step 605, it is determined whether the log LSN of the target data page has changed, if the log LSN of the target data page has changed, step 608 is performed, and if the log LSN of the target data page has not changed, step 606 is performed.

In step 606, the row record, following the last stored row record in the leaf cursor, in the target data page loaded to the memory is read, and the currently read row record is stored.

In step 607, the currently read row record is stored in the leaf cursor.

After the step 607, the process returns to step 604 until all the row records in the target data page are read.

In step 608, it is determined whether the LSN of the index page has changed, if the LSN of the index page has changed, step 610 is performed, and if the LSN of the index page has not changed, step 609 is performed.

In step 609, the target data page is repositioned in the memory according to the last stored index item in the non-leaf cursor.

After step 609, go back to step 606 and subsequent steps.

In step 610, a first primary key corresponding to the last stored row record in the leaf cursor is obtained; the index tree is traversed from the root node to the target leaf node, and the data page corresponding to the target leaf node includes at least one row record with the primary key less than or equal to the first primary key.

In step 611, the next row record following the at least one row record in the data page of the target leaf node loaded to the memory is read, and the currently read row record is stored.

After step 611, the process returns to step 607 and subsequent steps.

In some embodiments of the present disclosure, the leaf cursor is used for storing the row record read from the data page each time, and the non-leaf cursor is further used for storing the index item read from the index page each time, so as to quickly locate the next row record required to be read subsequently. Therefore, in some embodiments, after the current index item is read from the index page associated with the non-leaf node in sequence, the current index item is stored in the non-leaf cursor. After all the row records in the target data page are read, the last stored index item is obtained from the non-leaf cursor. The index item following the last stored index item is found from the index page associated with the non-leaf node, and the index item following the last stored index item is set as a new current index item, until processing of all index items in the index page associated with the non-leaf node is completed.

In some embodiments, if the LSN of the target data page or the LSN of the index page has not changed, the next returned row record is read at a small cost, thereby reducing unnecessary disk I/O overheads. If both the LSN of the target data page and the LSN of the index page have changed, the next row record required to be read is quickly located in the range finding manner of the primary key. Specifically, the primary key corresponding to the last stored row record in the leaf cursor is obtained and set as the first primary key. The index tree is traversed from the root node to the target leaf node, and the data page corresponding to the target leaf node includes at least one row record with the primary key less than or equal to the first primary key. The next row record following the at least one row record in the data page of the target leaf node loaded to the memory is read.

It should be noted that if there are multiple row records with the primary key less than or equal to the first primary key, the next row record following the row record with the maximum primary key is read.

Figure 7:
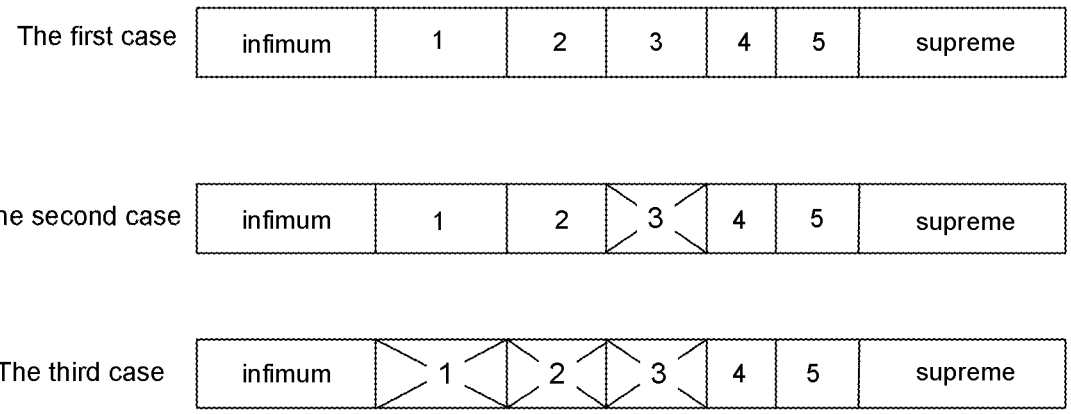
FIG. 7 is an exemplary row record variation case.

For ease of understanding, as shown in FIG. 7, it is assumed that a row record 3 in the target database table is a row record read last time. After the row record 3 is read from the memory, no matter what kind of transformation occurs in the data page including the row record 3, an interface InnodbSampler::next( ) is called to correctly return the next row record 4 to be sampled.

In the first case, before and after the row record 3 is read, the row record on the data page where the row record 3 is located has not changed.

For the above situation, firstly, InnodbSampler::next( ) is called to read the row record 3 from the data page, the row record 3 is sent to the client, and the row record 3 is stored in the leaf cursor. Next, InnodbSampler::next( ) is called to read the next row record, and when reading the next row record, the row record 3 read last time is located in the data page according to the row record 3 in the leaf cursor. Finally, a row record, i.e. row record 4, following the row record 3 is read, the row record 4 is sent to the client, and the row record 4 is stored in the leaf cursor.

In the second case, after reading the row record 3, the row record 3 is deleted from the data page where the row record 3 is located.

For the above situation, firstly, InnodbSampler::next( ) is called to read the row record 3 from the data page, the row record 3 is sent to the client, and the row record 3 is stored in the leaf cursor. Next, the row record 3 is deleted from the data page. In addition, InnodbSampler::next( ) is called to read the next row record. Specifically, the index tree is traversed within the primary key range corresponding to a row record, which is less than or equal to the row record 3 until the row record 2 is found on the data page. Since the row record 3 has been deleted, a row record following the row record 2 is the row record 4, the row record 4 is read and sent to the client, and the row record 4 is stored in the leaf cursor.

In the third case, after the row record 3 is read, the row record 1, the row record 2, and the row record 3 are deleted from the data page where the row record 3 is located.

It should be noted that each data page stores two special row records, including a row record infimum and a row record supreme. The row record infimum represents a logical minimum row record of the current data page. The row record supreme represents a logical maximum row record of the current data page. These two row records are used for marking a finding boundary and will not return to the client.

For the above situation, firstly, InnodbSampler::next( ) is called to read the row record 3 from the data page, send the read row record 3 to the client, and store the row record 3 in the leaf cursor. The row record 1, the row record 2 and the row record 3 are then deleted from the data page. And then, InnodbSampler::next( ) is called for triggering to read the next row record. Specifically, the index tree is traversed within the primary key range corresponding to a row record, which is less than or equal to the row record 3 until the row record infimum is found on the data page. Since the row record 1, the row record 2 and the row record 3 have been deleted, the row record following the row record infimum is set as the row record 4, the row record 4 is read and sent to the client, and the row record 4 is stored in the leaf cursor.

The manner of traversing the index tree based on the first primary key is a manner to find within the range of the primary key. As an example, an operation of traversing the index tree from the root node to the target leaf node includes the following steps. For other nodes except the target leaf node traversed currently, an index item matching the first primary key is determined from the index page associated with the other nodes. Child nodes of other nodes pointed by the index item matching the first primary key are traversed.

It should be noted that, if the index page associated with other nodes includes one index item, this index item is an index item matching the first primary key. If the index page associated with other nodes includes multiple index items, the primary key range indexed by each index item is analyzed to determine the index item corresponding to the primary key range, to which the first primary key belongs, is the index item matching the first primary key. It should be noted that, the primary key range of each index item is determined according to the primary key of each index item. The primary key recorded by each index item is the smallest primary key, and the primary key range of each index item is determined according to the smallest primary key recorded by each index item. For example, the primary key range corresponding to the index item (101, 501) in the index page 101 is from 101 to 200. The primary key range corresponding to the index item (201, 502) in the index page 101 is from 201 to 300. And the primary key range corresponding to the index item (301, 503) in the index page 101 is from 301 to 400.

Taking the index tree shown in FIG. 4 as an example, after reading the row record (180, Mu) from the data page with the page number 501, the row record of (180, Mu) is returned to the client, and the row record of (180, Mu) is stored in the leaf cursor. Then, before reading the row record (181, Jia), it is determined that both the data page with the page number 501 and the LSN of the index page with the page number 101 have changed, the index tree is traversed from the root node within a primary key range less than or equal to the primary key 181. And since the primary key 181 is less than the primary key 401 in the index item (401, 102) corresponding to the root node, the page number 101 of the index page with the primary key less than the primary key 400 is obtained from the page header of the index page with the page number 100. Based on the index page with the page number 101, the index page with the page number 101 is traversed. The index item (101, 501) matching the primary key 181 is determined from the three index items of the index page of 101, and then the data page with the page number 501 is traversed.

In some embodiments, a locking mechanism is further introduced to ensure the consistency of the data in the database. Therefore, in some embodiments, before reading the row record, following the last stored row record in the leaf cursor, in the target data page loaded to the memory, the target data page is locked. After reading the row record, following the last stored row record in the leaf cursor, in the target data page loaded to the memory, the lock on the target data page is released. It should be noted that after the target data page is locked, a specified operation is allowed to be performed on the target data page, and the specified operation includes, for example, reading a row record in the target data page.

In some embodiments, in the process of traversing the index tree of the target database table, when traversing to the parent node, the index page corresponding to the parent node is locked, for example, a Shared Lock (S lock). When the child node of the parent node is traversed, the index page or the data page of the child node is locked, and the lock on the index page corresponding to the parent node is released.

In the technical solution provided in some embodiments of the present disclosure, in a process of obtaining random sampling data from the target database table, through an index tree scanning manner in combine with a mechanism for random sampling a data page of the database table, full-table scanning is not performed on the target database table, thereby effectively reducing the number of times that I/O access is performed on the disk, saving disk I/O resources, and enhancing the query performance of the database system, especially in the case that the distributed database system has mass data. Furthermore, the leaf cursor and the non-leaf cursor are used to control the reading process of the row record, and the row record of the data page can be read more accurately from the memory one by one.

Generally, the flow of executing the SQL statement by the database system includes the following step. First, a syntax check operation is performed on a Structured Query Language (SQL) statement submitted by the client, and a semantic check operation is performed on the SQL statement. Second, the SQL statement is parsed to generate a syntax tree. Third, a preliminary execution plan is generated based on the syntax tree. Fourth, the preliminary execution plan is optimized to obtain a final execution plan. At last, the final execution plan is converted into a physical execution plan, the database is queried according to the physical execution plan to obtain the query result of the SQL statement, and the query result is returned to the client. The performance of the execution plan directly affects the query performance of the database system. The process of generating or optimizing the execution plan is relied on data information in the database, such as data size, data distribution, and unique value. Currently, a full-table scanning manner is commonly used for performing random sampling in the database to obtain data information and the execution plan is generated or optimized according to the data information. However, in particular, in the case that the distributed database system has mass data, the foregoing manner consumes more disk I/O quantity, thereby reducing the query performance of the database system.

Figure 8:
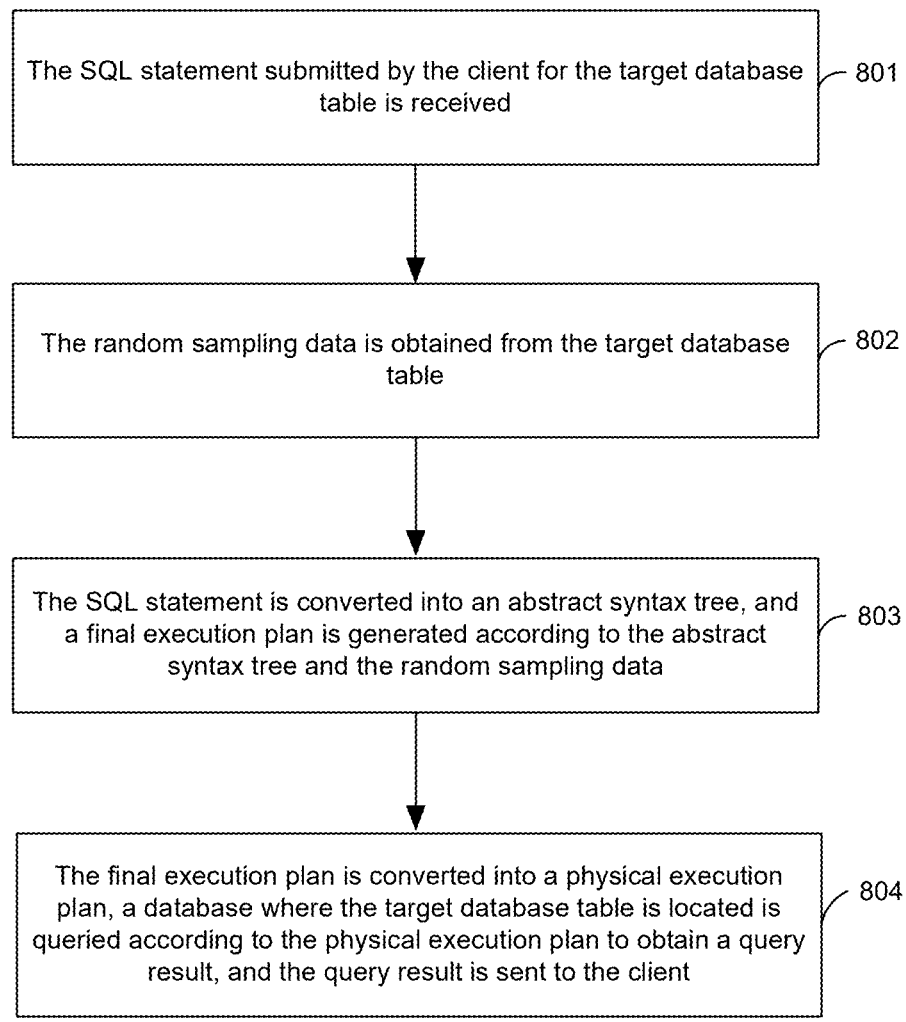
FIG. 8 is a flowchart of another data processing method according to some embodiments of the present disclosure.

To this end, some embodiments of the present disclosure further provide a data processing method as shown in FIG. 8, and the data processing method includes the following steps.

In step 801, the SQL statement submitted by the client for the target database table is received.

In step 802, the random sampling data is obtained from the target database table.

In step 803, the SQL statement is converted into an abstract syntax tree, and a final execution plan is generated according to the abstract syntax tree and the random sampling data.

In step 804, the final execution plan is converted into a physical execution plan, a database where the target database table is located is queried according to the physical execution plan to obtain a query result, and the query result is sent to the client.

Further, an operation of generating the final execution plan according to the abstract syntax tree and the random sampling data includes the following steps. A preliminary execution plan is generated based on the random sampling data and the abstract syntax tree. The preliminary execution plan is optimized based on the random sampling data to obtain the final execution plan.

In some embodiments, the random sampling data is obtained from the target database table by using the data processing method provided in the foregoing method embodiments, and details are not described herein again.

In the technical solution provided in some embodiments of the present disclosure, when processing the SQL statement initiated by the client, the random sampling data is obtained from the target database table through an index tree scanning manner in combine with a mechanism for random sampling a data page of the database table, thereby effectively reducing the number of times that I/O access is performed on the disk, saving disk I/O resources, and enhancing the query performance of the database system, especially in the case that the distributed database system has mass data.

Figure 9:
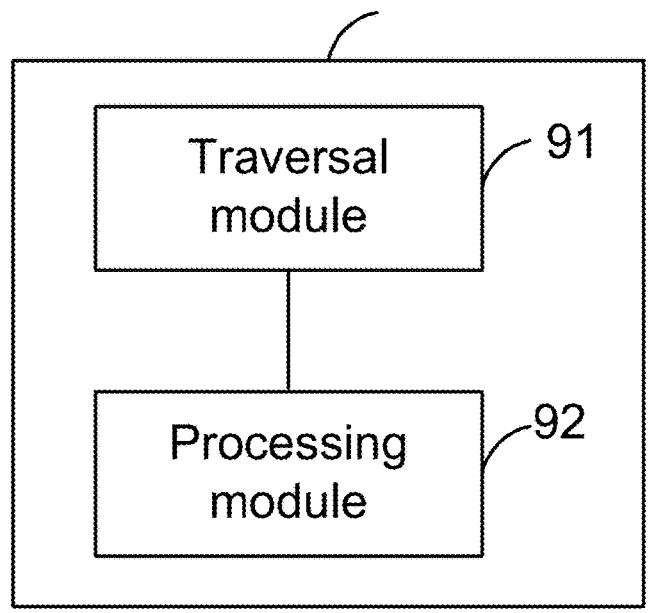
FIG. 9 is a schematic structural diagram of a data processing apparatus according to some embodiments of the present disclosure.

FIG. 9 is a schematic structural diagram of a data processing apparatus according to some embodiments of the present disclosure. As shown in FIG. 9, the apparatus includes a traversal module 91 and a processing module 92.

The traversing module 91 is arranged for traversing an index tree corresponding to a target database table to determine the last non-leaf layer of the index tree, each leaf node in a leaf layer of the index tree being associated with a data page in a disk, and different data pages storing different row records of the target database table.

The processing module 92 is arranged for, for each non-leaf node in the last non-leaf layer, sequentially reading a current index item from an index page associated with the non-leaf node, and randomly generating a random number for the current index item.

The processing module 92 is further arranged for, in response to the random number meeting a random data sampling condition, loading a target data page of a leaf node, pointed by the current index item, from the disk to a memory, reading row records in the target data page from the memory and storing the row records.

Further optionally, after reading row records in the target data page from the memory and storing the row records, the processing module 92 is further arranged for sending the stored row records to a client; or, performing information statistics on the stored row records, and sending statistical result information to the client.

Further optionally, when the processing module 92 reading row records in the target data page from the memory and storing the row records, the processing module 92 is arranged for, in response to a row record collection event triggered by calling a row record collection interface, reading a row record, following the last stored row record in the leaf cursor, in the target data page loaded to the memory, and storing the currently read row record; and storing the currently read row record in the leaf cursor; repeating the above steps until all row records in the target data page have been read Further optionally, before the processing module 92 reading the row record, following the last stored row record in the leaf cursor, in the target data page loaded to the memory, the processing module 92 is further arranged for determining whether a LSN of the target data page has changed; and in response to the LSN of the target data page having not changed, executing an operation of reading the row record, following the last stored row record in the leaf cursor, in the target data page loaded to the memory.

Further optionally, the processing module 92 is further arranged for, in response to the LSN of the target data page having changed, determining whether a LSN of the index page has changed; in response to the LSN of the index page having not changed, reading the last stored index item in a non-leaf cursor; and repositioning, based on the last stored index item in the non-leaf cursor, the target data page in the memory, and executing the operation of reading the row record, following the last stored row record in the leaf cursor, in the target data page loaded to the memory.

Further optionally, after sequentially reading the current index item from the index page associated with the non-leaf node, the processing module 92 is further arranged for storing the current index item in the non-leaf cursor; after all row records in the target data page have been read, obtaining the last stored index item from the non-leaf cursor; and finding the index item after the last stored index item in the index page associated with the non-leaf node, and setting the index item after the last stored index item as a new current index item, until all index items in the index page associated with the non-leaf node have been processed.

Further optionally, the processing module 92 is further arranged for, in response to the LSN of the index page having changed, obtaining a first primary key corresponding to the last stored row record in the leaf cursor; traversing the index tree from a root node to a target leaf node, a data page corresponding to the target leaf node including at least one row record with a primary key less than or equal to the first primary key; reading the next row record following the at least one row record in the data page of the target leaf node loaded in the memory, and storing the currently read row record; and returning to the step of storing the currently read row record in the leaf cursor.

Further optionally, when the processing module 92 traversing the index tree from the root node to the target leaf node, the processing module 92 is arranged for, for other nodes except the target leaf node currently being traversed, determining a index item, matching with the first primary key, in a index page associated with the other nodes; traversing child nodes of the other nodes pointed by the index item matching with the first primary key.

Further optionally, the processing module 92 is further arranged for locking the target data page before reading the row record, following the last stored row record in the leaf cursor, in the target data page loaded to the memory; and the processing module 92 is further arranged for releasing the lock on the target data page after reading the row record, following the last stored row record in the leaf cursor, in the target data page loaded to the memory.

Further optionally, the index tree is a B+tree index tree.

A specific manner in which each module performs operations shown in the data processing apparatus shown in FIG. 9 refers to related descriptions in the foregoing method embodiments, and details are not described herein again.

A detailed implementation process of performing each action by the processor refers to related descriptions in the foregoing method embodiments or device embodiments, and details are not described herein again.

It should be noted that the executed object of each step of the method provided in the foregoing embodiment is the same device, or the method is further used by different devices as the executed object. For example, the executed object of step 501 to step 504 is device A. For another example, the executed object of steps 501 and 502 is device A, and the executed object of steps 503 and 504 is device B; etc.

In addition, in some processes described in the foregoing embodiments and the accompanying drawings, multiple operations occurring in a specific order are included, but it should be clear that the operations are not performed or performed in parallel according to the order in which the operations occur, the sequence numbers of the operations are 501, 502, and the like, but are used for distinguishing different operations, and the sequence numbers do not represent any execution order. In addition, these processes include more or fewer operations, and these operations are performed sequentially or in parallel. It should be noted that descriptions such as "first" and "second" herein are used for distinguishing different messages, devices, modules, etc. do not represent a sequence, and also do not define "first" and "second" are different types.

Figure 10:
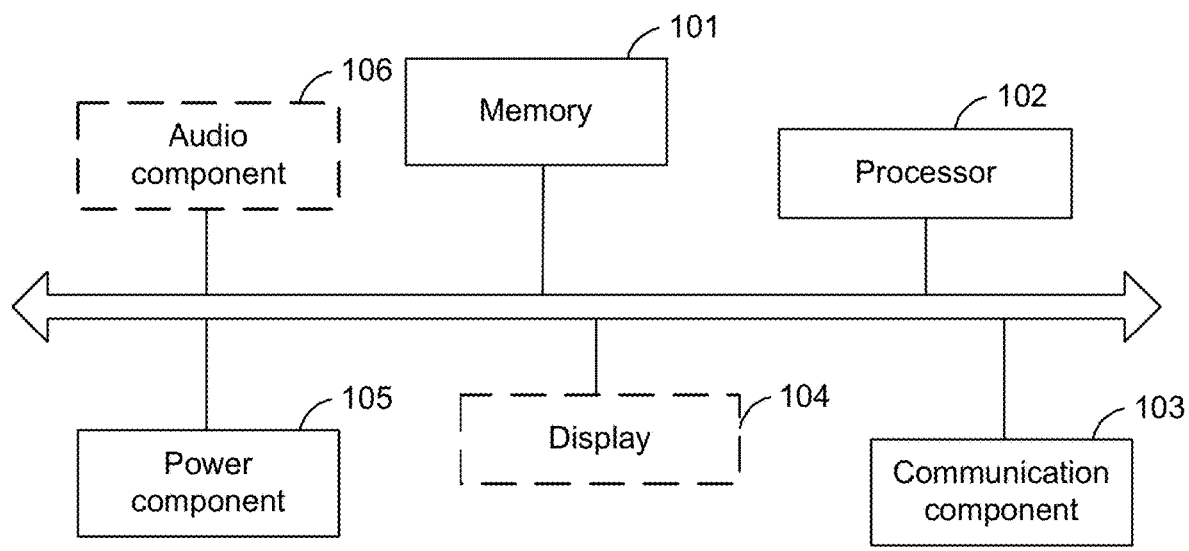
FIG. 10 is a schematic structural diagram of an electronic device according to some embodiments of the present disclosure.

FIG. 10 is a schematic structural diagram of an electronic device according to some embodiments of the present disclosure. As shown in FIG. 10, the electronic device includes a memory 101 and a processor 102.

The memory 101 is arranged for storing a computer program, and is further arranged for storing various other data to support operations on a computing platform. Examples of such data include instructions, contact data, phonebook data, messages, pictures, videos, etc. for any application or method operating on a computing platform.

The memory 101 is implemented by any type of transitory or non-transitory storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The processor 102 is coupled with the memory 101 and arranged for executing the computer program in the memory 101, so as to traverse an index tree corresponding to a target database table to determine the last non-leaf layer of the index tree, each leaf node in a leaf layer of the index tree being associated with a data page in a disk, and different data pages storing different row records of the target database table; for each non-leaf node in the last non-leaf layer, sequentially read a current index item from an index page associated with the non-leaf node, and randomly generate a random number for the current index item; and in response to the random number meeting a random data sampling condition, load a target data page of a leaf node, pointed by the current index item, from the disk to a memory, read row records in the target data page from the memory and store the row records.

Alternatively, the processor 102 is coupled with the memory 101, and is arranged for executing the computer program in the memory 101, to receive an SQL statement submitted by a client for a target database table; obtain random sampling data from the target database table; convert the SQL statement into an abstract syntax tree, and generate a final execution plan based on the random sampling data and the abstract syntax tree; convert the final execution plan into a physical execution plan, and query a database where the target database table is located according to the physical execution plan to obtain a query result, and output the query result to the client.

Further, as shown in FIG. 10, the electronic device further includes other components such as a communication component 103, a display 104, a power component 105, and an audio component 106. Some components are schematically shown in FIG. 10, and do not mean that the electronic device includes only the components shown in FIG. 10. In addition, the components within the dashed box in FIG. 10 are optional components, rather than the necessary components, depending on the product morphology of the electronic device. The electronic device in some embodiments is implemented as a terminal device such as a desktop computer, a notebook computer, a smart phone, or an Internet of Things (IoT) device, or is a server device such as a conventional server, a cloud server, or a server array. If the electronic device in some embodiments is implemented as a terminal device such as a desktop computer, a notebook computer, and a smart phone, the electronic device includes the components in the dashed box as shown in FIG. 10. If the electronic device in some embodiments is implemented as a server device such as a conventional server, a cloud server, or a server array, the electronic device does not include the components in the dashed box as shown in FIG. 10.

A detailed implementation process of performing each action by the processor refers to related descriptions in the foregoing method embodiments or system embodiments, and details are not described herein again.

Correspondingly, some embodiments of the present disclosure further provide a computer-readable storage medium storing a computer program, where the computer program is executed to implement steps which is performed by the electronic device in the foregoing method embodiments.

Correspondingly, some embodiments of the present disclosure further provide a computer program product, including a computer program/instruction, and when the computer program/instruction is executed by the processor, the processor implements the steps that are executed by the electronic device in the foregoing method embodiments.

The communication component is arranged for facilitating wired or wireless communication between a device where the communication component is located and another device. The device where the communication component is located accesses a wireless network based on a communication standard, such as a mobile communication network such as Wireless Fidelity (WiFi), 2G, 3G, 4G/Long-Term Evolution (LTE), and 5G, or a combination thereof. In an exemplary embodiment, the communication component receives a broadcast signal or broadcast related information from an external broadcast management system via a broadcast channel. In an exemplary embodiment, the communication component further includes a Near Field Communication (NFC) module to facilitate short-range communications. For example, the NFC module is implemented based on a Radio Frequency Identification (RFID) technology, an infrared data association (IrDA) technology, an ultra-wideband (UWB) technology, a Bluetooth (BT) technology, and other technologies.

The display includes a screen, and a screen of the display includes a Liquid Crystal Display (LCD) and a Touch Panel (TP). If the screen includes the touch panel, the screen is implemented as a touch screen to receive input signals from the user. The touch panel includes at least one touch sensor to sense touches, swipes, and gestures on the touch panel. The touch sensor not only senses a boundary of a touch or swipe action, but also detects a duration and pressure associated with a touch or swipe action.

The power supply component provides power for various components of the device where the power supply component is located. The power component includes a power management system, at least one power supply, and other components associated with generating, managing, and distributing power for devices where the power component is located.

The audio component is arranged for output and/or input an audio signal. For example, the audio component includes a microphone (MIC) arranged for receiving an external audio signal when the device, where the audio component is located, is in an operation mode, such as a call mode, a recording mode, and a voice recognition mode. The received audio signal is further stored in a memory or transmitted via a communication component. In some embodiments, the audio component further includes a speaker arranged for outputting an audio signal.

Those skilled person in the art should understand that the embodiments of the present disclosure are provided as a method, a system, or a computer program product. Therefore, the present disclosure uses a form of hardware embodiments, software embodiments, or embodiments with a combination of software and hardware. Moreover, the present disclosure uses a form of a computer program product implemented on at least one computer-usable storage media (including but not limited to a disk memory, a CD-ROM, an optical memory, and the like) including computer-usable program codes.

The present disclosure is described with reference to the flowcharts and/or block diagrams of the method, the device (system), and the computer program product according to the embodiments of the present disclosure. It should be understood that computer program instructions are used for implementing each process and/or block in the flowcharts and/or the block diagrams and a combination of a process and/or a block in the flowcharts and/or the block diagrams. These computer program instructions are provided to a general-purpose computer, a special-purpose computer, an embedded processor, or a processor of another programmable data processing device to generate a machine, so that the instructions executed by the processor of the computer or other programmable data processing devices generate an apparatus for implementing the functions specified in at least one flow of the flowcharts and/or at least one block in the block diagrams.

These computer program instructions are also stored in a computer-readable memory capable of guiding a computer or other programmable data processing devices to operate in a specific manner, so that the instructions stored in the computer-readable memory produce an article of manufacture including an instruction apparatus that implements the functions specified in at least one flow of the flowchart and/or at least one block of the block diagram.

These computer program instructions are also loaded onto a computer or other programmable data processing device such that a series of operational steps are performed on the computer or other programmable device to produce a computer-implemented process, such that the instructions executed on the computer or other programmable device provide steps for implementing the functions specified in at least one flow of the flowchart and/or at least one block of the block diagram.

In a typical configuration, a computing device includes at least one processor (CPU), input/output interfaces, network interfaces, and memories.

The memory includes a non-persistent memory, a random access memory (RAM), and/or a non-transitory memory in a computer-readable medium, for example, a read-only memory (ROM) or a flash RAM. The memory is an example of a computer-readable medium.

The computer-readable medium includes persistent, non-persistent, movable and non-removable media which store information by using any method or technology. The information includes a computer-readable instruction, a data structure, a program module, or other data. Examples of computer storage media include, but are not limited to, phase-change random access memory (PRAM), static random access memory (SRAM), dynamic random access memory (DRAM), other types of random access memory (RAM), read only memory (ROM), electrically erasable programmable read only memory (EEPROM), flash memory or other memory technology, read only optical disk read only memory (CD-ROM), digital versatile disk (DVD) or other optical storage, magnetic cassettes, a magnetic tape disk storage or other magnetic storage device or any other non-transmission medium, which are used for storing information which is accessed by a computing device. As defined herein, the computer-readable medium does not include transitory media, such as a modulated data signal and a carrier.

It should also be noted that the terms "containing", "including" or any other variation thereof are intended to cover a non-exclusive inclusion, so that a process, method, commodity, or device that includes a series of elements includes not only those elements, but also other elements that are not explicitly listed, or elements inherent to such a process, method, commodity, or device. In the absence of more restrictions, an element limited by the statement "including one" does not rule out additional identical elements existing in the process, method, product, or device.

The foregoing descriptions are embodiments of the present disclosure, and are not intended to limit the present disclosure. For the person having ordinary skill in the art, the present disclosure has various modifications and changes. Any modification, equivalent replacement. or improvement made without departing from the spirit and principle of the present disclosure shall fall within the scope of the claims of the present disclosure.

The invetion claimed is:

1. A data processing method, characterized by comprising:
    traversing an index tree corresponding to a target database table to determine the last non-leaf layer of the index tree, each leaf node in a leaf layer of the index tree being associated with a data page in a disk, and different data pages storing different row records of the target database table;
    for each non-leaf node in the last non-leaf layer, sequentially reading a current index item from an index page associated with the non-leaf node, and randomly generating a random number for the current index item;

in response to the random number meeting a random data sampling condition, loading a target data page of a leaf node, pointed by the current index item, from the disk to a memory, then reading row records in the target data page from the memory and storing the row records.

2. The method as claimed in claim 1, characterized in that, after reading row records in the target data page from the memory and storing the row records, the method further comprises:

sending the stored row records to a client; or, performing information statistics on the stored row records, and sending statistical result information to a client.

3. The method as claimed in claim 1, characterized in that, reading row records in the target data page from the memory and storing the row records comprises:

in response to a row record collection event triggered by calling a row record collection interface, reading a row record, following the last stored row record in the leaf cursor, in the target data page loaded to the memory, and storing the currently read row record;

storing the currently read row record in the leaf cursor; repeating the above steps until all row records in the target data page have been read.

4. The method as claimed in claim 3, characterized in that, before reading the row record, following the last stored row record in the leaf cursor, in the target data page loaded to the memory, the method further comprises:

determining whether a log sequence number (LSN) of the target data page has changed;

in response to the LSN of the target data page having not changed, executing an operation of reading the row record, following the last stored row record in the leaf cursor, in the target data page loaded to the memory.

5. The method as claimed in claim 4, characterized in that, the method further comprises:

in response to the LSN of the target data page having changed, determining whether a LSN of the index page has changed;

in response to the LSN of the index page having not changed, reading the last stored index item in a non-leaf cursor;

repositioning, based on the last stored index item in the non-leaf cursor, the target data page in the memory, and executing the operation of reading the row record, following the last stored row record in the leaf cursor, in the target data page loaded to the memory.

6. The method as claimed in claim 5, characterized in that, after sequentially reading the current index item from the index page associated with the non-leaf node, the method further comprises:

storing the current index item in the non-leaf cursor;

after all row records in the target data page have been read, obtaining the last stored index item from the non-leaf cursor;

finding the index item after the last stored index item in the index page associated with the non-leaf node, and setting the index item after the last stored index item as a new current index item, until all index items in the index page associated with the non-leaf node have been processed.

7. The method as claimed in claim 5, characterized in that, the method further comprises:

in response to the LSN of the index page having changed, obtaining a first primary key corresponding to the last stored row record in the leaf cursor;

traversing the index tree from a root node to a target leaf node, a data page corresponding to the target leaf node comprising at least one row record with a primary key less than or equal to the first primary key;

reading the next row record following the at least one row record in the data page of the target leaf node loaded in the memory, and storing the currently read row record;

returning to the step of storing the currently read row record in the leaf cursor.

8. The method as claimed in claim 7, characterized in that, traversing the index tree from the root node to the target leaf node comprises:

for other nodes except the target leaf node currently being traversed, determining an index item, matching with the first primary key, in a index page associated with the other nodes; and traversing child nodes of the other nodes pointed by the index item matching with the first primary key.

9. The method as claimed in claim 2, characterized in that, before reading the row record, following the last stored row record in the leaf cursor, in the target data page loaded to the memory, the method further comprises:

locking the target data page;

after reading the row record, following the last stored row record in the leaf cursor, in the target data page loaded to the memory, the method further comprises:

releasing the lock on the target data page.

10. The method as claimed in claim 1, characterized in that, the index tree is a B+tree index tree.

11. The method as claimed in claim 1, characterized in that the method further comprises:

receiving a structured query language SQL statement submitted by a client for a target database table;

obtaining random sampling data from the target database table;

converting the SQL statement into an abstract syntax tree, and generating a final execution plan based on the random sampling data and the abstract syntax tree;

converting the final execution plan into a physical execution plan, and querying a database where the target database table is located according to the physical execution plan to obtain a query result, and outputting the query result to the client.

12. The method as claimed in claim 11, characterized in that, generating the final execution plan based on the random sampling data according to the abstract syntax tree comprises:

generating a preliminary execution plan based on the random sampling data and the abstract syntax tree;

optimizing, based on the random sampling data, the preliminary execution plan to obtain the final execution plan.

13. An electronic device, characterized by comprising: a memory and a processor; the memory is arranged for storing a computer program; the processor is coupled with the memory and is arranged for executing the computer program to perform the steps:

traversing an index tree corresponding to a target database table to determine the last non-leaf layer of the index tree, each leaf node in a leaf layer of the index tree being associated with a data page in a disk, and different data pages storing different row records of the target database table;

for each non-leaf node in the last non-leaf layer, sequentially reading a current index item from an index page associated with the non-leaf node, and randomly generating a random number for the current index item;

in response to the random number meeting a random data sampling condition, loading a target data page of a leaf node, pointed by the current index item, from the disk to a memory, reading row records in the target data page from the memory and storing the row records.

14. The method as claimed in claim 1, characterized in that the target database table is any database table maintained in a database.

15. The method as claimed in claim 1, characterized in that the index page associated with and the non-leaf node comprises at least one index item, and each index item comprises one primary key and access information pointing to a child node.

16. The method as claimed in claim 15, characterized in that the access information pointing to the child node comprises a page number and storage location information of the index page or the data page associated with the child node.

17. The method as claimed in claim 1, characterized in that the random data sampling condition comprises: the random number being less than or equal to a specified value.

18. The method as claimed in claim 3, characterized in that the leaf cursor is used for storing the row record read each time.

19. The method as claimed in claim 5, characterized in that the non-leaf cursor is used for storing the index item read from the index page each time.

20. The method as claimed in claim 9, characterized in that after the target data page is locked, a specified operation is allowed to be performed on the target data page.

* * * * *